United States Patent [19]
Chern et al.

[11] Patent Number: 5,774,178
[45] Date of Patent: Jun. 30, 1998

[54] APPARATUS AND METHOD FOR REARRANGING DIGITIZED SINGLE-BEAM COLOR VIDEO DATA AND CONTROLLING OUTPUT SEQUENCE AND TIMING FOR MULTIPLE-BEAM COLOR DISPLAY

[76] Inventors: Mao-Jin Chern, 29 Industrial East 9th Road 2nd Fl., Science-Based Industrial Park, Hsinchu; Yee-Lu Zhaog, Industrial Technology Research Institute, 195 Section 4, Chung-Hsing Road, Chutung, Hsinchu; Robert Hu, 29 Industrial East 9th Road 2nd Fl., Science-Based Industrial Park, Hsinchu; Yen-Chen Chen, Industrial Technology Research Institute, 195 Section 4, Chung-Hsing Road, Chutung, Hsinchu, all of Taiwan

[21] Appl. No.: 619,019

[22] Filed: Mar. 20, 1996

[51] Int. Cl.[6] ............................ H04N 3/28; H04N 9/31
[52] U.S. Cl. .............................. 348/206; 348/742
[58] Field of Search .......................... 348/206, 441, 348/455, 742, 781, 816

[56] References Cited

U.S. PATENT DOCUMENTS

| | | | |
|---|---|---|---|
| 3,781,465 | 12/1973 | Ernstoff et al. | 348/742 |
| 3,943,281 | 3/1976 | Keller et al. | 348/206 |
| 4,582,396 | 4/1986 | Bos et al. | 350/347 E |
| 4,907,862 | 3/1990 | Suntola | 350/345 |
| 5,350,978 | 9/1994 | Chen | 315/368.15 |
| 5,389,855 | 2/1995 | Chen | 315/14 |

FOREIGN PATENT DOCUMENTS

| | | | |
|---|---|---|---|
| 1295588 | 11/1989 | Japan | H04N 9/31 |
| 2172733 | 9/1986 | United Kingdom | G09G 3/00 |
| WO9005429 | 5/1990 | WIPO | H04N 9/31 |

Primary Examiner—Mark R. Powell
Attorney, Agent, or Firm—Bo-In Lin

[57] ABSTRACT

A multiple-beam field sequential color (FSC) display system is provided for receiving a stream of digitized single-beam image data to display a color image by employing a plurality of CRT guns to project multiple beams on a monochromatic CRT screen followed by converting a monochromatic refection from the CRT screen to the color image by using a liquid crystal color system (LCCS). The multiple-beam display system includes a multiple-beam image data memory which includes a plurality of data-banks. The multiple beam display system further includes an image data rearranging processor for rearranging and storing the plurality of digitized single-beam image data in the multiple beam-image data memory according to a pre-designated multiple-beam sequence in each of the data-banks. The multiple beam display system further includes a multiple-beam image data output controller for receiving a plurality of clock signals to control a sequence and timing of transmitting a multiple-beam image data from the multiple-beam data memory to the plurality of CRT guns for projecting the multiple beams for generating the color image.

13 Claims, 10 Drawing Sheets

FIG. 4B SPECIAL GUI CARD SYSTEM CONFIGURATION

| WHEN INPUT SIGNAL IS ODD FRAME AND ... | WRITE CONNECTION SWITCH CONNECTION DIRECTION (CONNECTION SHIFT EVERY ONE SCANNING LINE) | |
|---|---|---|
| LINE 3*N+0 | RBUS →<br>GBUS →<br>BBUS → | BUS1A ==> WRITE R LINE 3*N+0 INTO DRAM1A SEG1<br>BUS2A ==> WRITE G LINE 3*N+0 INTO DRAM2A SEG2<br>BUS3A ==> WRITE B LINE 3*N+0 INTO DRAM3A SEG3 |
| LINE 3*N+1 | RBUS ⤫<br>GBUS ⤫<br>BBUS ⤫ | BUS1A ==> WRITE B LINE 3*N+1 INTO DRAM1A SEG3<br>BUS2A ==> WRITE R LINE 3*N+1 INTO DRAM2A SEG1<br>BUS3A ==> WRITE G LINE 3*N+1 INTO DRAM3A SEG2 |
| LINE 3*N+2 | RBUS ⤫<br>GBUS ⤫<br>BBUS ⤫ | BUS1A ==> WRITE G LINE 3*N+2 INTO DRAM1A SEG2<br>BUS2A ==> WRITE B LINE 3*N+2 INTO DRAM2A SEG3<br>BUS3A ==> WRITE R LINE 3*N+2 INTO DRAM3A SEG1 |

| WHEN INPUT SIGNAL IS EVEN FRAME AND ... | READ CONNECTION SWITCH CONNECTION DIRECTION (CONNECTION SHIFT EVERY ONE-THIRD FRAME) | |
|---|---|---|
| FIRST ONE-THIRD FRAME | BUS1B →<br>BUS2B →<br>BUS3B → | DABUS1 ==> READ R LINE 3*N+0 FROM DRAM1B SEG1<br>DABUS2 ==> READ R LINE 3*N+1 FROM DRAM2B SEG1<br>DABUS3 ==> READ R LINE 3*N+2 FROM DRAM3B SEG1 |
| SECOND ONE-THIRD FRAME | BUS1B ⤫<br>BUS2B ⤫<br>BUS3B ⤫ | DABUS1 ==> READ G LINE 3*N+0 FROM DRAM3B SEG2<br>DABUS2 ==> READ G LINE 3*N+1 FROM DRAM1B SEG2<br>DABUS3 ==> READ G LINE 3*N+2 FROM DRAM2B SEG2 |
| LAST ONE-THIRD FRAME | BUS1B ⤫<br>BUS2B ⤫<br>BUS3B ⤫ | DABUS1 ==> READ B LINE 3*N+0 FROM DRAM2B SEG3<br>DABUS2 ==> READ B LINE 3*N+1 FROM DRAM3B SEG3<br>DABUS3 ==> READ B LINE 3*N+2 FROM DRAM1B SEG3 |

FIG. 8A

| WHEN INPUT SIGNAL IS EVEN FRAME AND ... | WRITE CONNECTION SWITCH CONNECTION DIRECTION (CONNECTION SHIFT EVERY ONE SCANNING LINE) | |
|---|---|---|
| LINE 3*N+0 | RBUS ↑ BUS1B<br>GBUS ↑ BUS2B<br>BBUS ↑ BUS3B | ==> WRITE R LINE 3*N+0 INTO DRAM1B SEG1<br>==> WRITE G LINE 3*N+1 INTO DRAM2B SEG2<br>==> WRITE B LINE 3*N+2 INTO DRAM3B SEG3 |
| LINE 3*N+1 | RBUS ⤫ BUS1B<br>GBUS ⤫ BUS2B<br>BBUS ⤫ BUS3B | ==> WRITE R LINE 3*N+1 INTO DRAM1B SEG3<br>==> WRITE G LINE 3*N+1 INTO DRAM2B SEG1<br>==> WRITE B LINE 3*N+1 INTO DRAM3B SEG2 |
| LINE 3*N+2 | RBUS ⤫ BUS1B<br>GBUS ⤫ BUS2B<br>BBUS ⤫ BUS3B | ==> WRITE R LINE 3*N+2 INTO DRAM1B SEG2<br>==> WRITE G LINE 3*N+2 INTO DRAM2B SEG3<br>==> WRITE B LINE 3*N+2 INTO DRAM3B SEG1 |

| WHEN INPUT SIGNAL IS ODD FRAME AND ... | READ CONNECTION SWITCH CONNECTION DIRECTION (CONNECTION SHIFT EVERY ONE-THIRD FRAME) | |
|---|---|---|
| FIRST ONE-THIRD FRAME | BUS1A ↑ DABUS1<br>BUS2A ↑ DABUS2<br>BUS3A ↑ DABUS3 | ==> READ R LINE 3*N+0 FROM DRAM1A SEG1<br>==> READ R LINE 3*N+1 FROM DRAM2A SEG2<br>==> READ R LINE 3*N+2 FROM DRAM3A SEG3 |
| SECOND ONE-THIRD FRAME | BUS1A ⤫ DABUS1<br>BUS2A ⤫ DABUS2<br>BUS3A ⤫ DABUS3 | ==> READ G LINE 3*N+0 FROM DRAM2A SEG2<br>==> READ G LINE 3*N+1 FROM DRAM1A SEG2<br>==> READ G LINE 3*N+2 FROM DRAM2A SEG2 |
| LAST ONE-THIRD FRAME | BUS1A ⤫ DABUS1<br>BUS2A ⤫ DABUS2<br>BUS3A ⤫ DABUS3 | ==> READ B LINE 3*N+0 FROM DRAM2A SEG3<br>==> READ B LINE 3*N+1 FROM DRAM3A SEG3<br>==> READ B LINE 3*N+2 FROM DRAM1A SEG3 |

FIG. 8B

APPARATUS AND METHOD FOR REARRANGING DIGITIZED SINGLE-BEAM COLOR VIDEO DATA AND CONTROLLING OUTPUT SEQUENCE AND TIMING FOR MULTIPLE-BEAM COLOR DISPLAY

BACKGROUND OF THE INVENTION

1. Field of the Invention

This invention relates generally to apparatus and method for image display. More particularly, this invention relates to a multiple beam display system which applies a novel system configuration by the use of an improved image data processing scheme such that the field sequential techniques can be effectively implemented by using a monochromic image source in combination with the color shutters to achieve a low cost high quality image display.

2. Description of the Prior Art

A system designer applying the field sequential color (FSC) techniques for creating color image display is facing a difficult challenge to produce a high resolution large screen display with sufficient brightness. This challenge imposes technical difficulties as well as economical limitations. Specifically, due to the requirements of high resolution for large screen display, increased number of color pixels, which includes three "subpixel elements, i.e., the red-green-blue (RGB) subpixles for color display, have to be processed and then displayed under the control of display electronics. Image data processors and graphic display electronics, e.g., controller, data buses, image data storage devices, etc., of higher speed and functional performance have to be designed and implemented. Practically, image display systems with special design components become too costly and not marketable in today's electronic consumer environment. Due to the lack of market incentive, technology development and progress are also lag behind when compared to the rest of information technology. With rapid developments in hardware and software of the computer and network technologies in entering into a multi-media era, color image display industry becomes a development bottleneck due to these difficulties.

A color image is produced in a "spatial" arrangements by the use of a plurality color elements, i.e., color pixels, each of these color pixels contains three subpixels including red, green, and blue (RGB) subpixels. The subpixels are arranged to display in almost identical spatial point on the screen that the eye cannot resolved these three individual elements. A viewer would then perceive each pixel as a single color element. By arranging the relative intensity of the individual color subpixels, the combination of RGB can generate a great variety of colors. The field sequential color (FSC) display also generates the color images in a "temporal" manner. For the purpose of generating a color image spatially, each color image is decomposed into red, green and blue color field of varying intensity. These fields, i.e., a R-field, G-field, and B-field, are then displayed over a pre-determined time slot sequentially. By displaying these fields rapidly over time slots, a human visual system fuses the individual color fields into a full-color image. Please refer to FIG. 1 for an example of the practical FSC implementation. A FSC display is implemented by the use of a monochrome CRT with a white phosphor that emits light over a broad range of visible wave-lengths when it is excited by the scanning of the CRT's electron gun. The electronic information for a single color image, i.e., a frame, is decomposed into its primary color RGB components. A red-filter is first placed in front of the CRT to provide to a viewer the red portion of the CRT light As soon as the scanning of the red field is completed, i.e., a red-time slot is exhausted for scanning, a green filter is placed in front of the CRT, then followed by a blue filter when the scanning of the green field is completed. The refresh rate of a color frame is generally greater than 60 Hz and the viewer sees a continuous blend of color and full-motion video.

Figure 1:
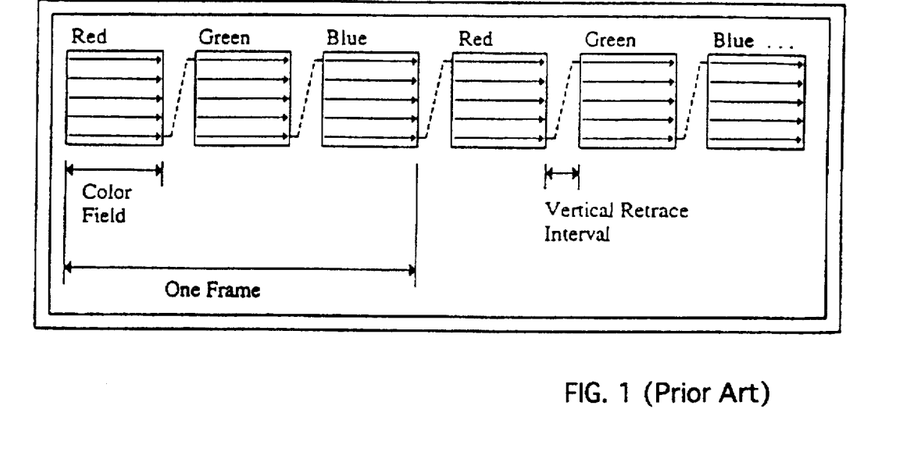
FIG. 1 shows the color fields and the scanning sequences of a field sequential color (FSC) display system.
Figure 2:
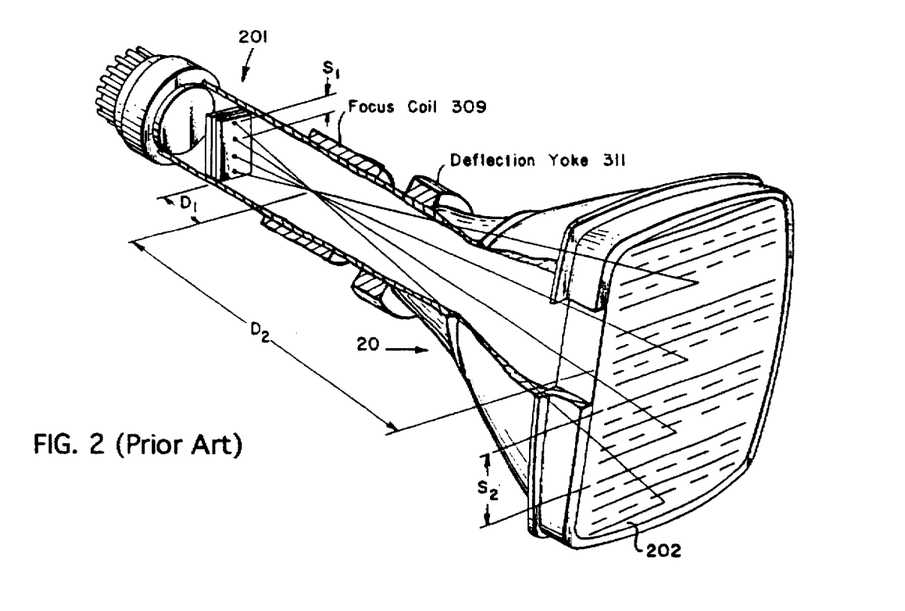
FIG. 2 is a multiple beam CRT disclosed in a prior art patented invention.

Keller at al. disclose in U.S. Pat. No. 3,943,281, entitled "Multiple Beam CRT for Generating a Multiple Raster Display"(issued Mar. 9, 1976) a low bandwidth high brightness display system that utilizes a multiple beam cathode ray tube (CRT) to write multiple rasters by concurrently scanning a plurality of lines with a selected number of beams. Each of the rasters covers a different portion of the screen so that the vertical deflection of the beam is reduced for each beam by a factor related to the number of beams. The system reduces the maximum data rate in writing speed such that the bandwidth of the display system may be reduced. FIG. 1 shows a CRT tube employed in this multiple beam system. While the multiple beam CRT display system disclosed by Keller et al. is able to reduce the bandwidth of scanning of the beam when there are multiple beams, it imposes a requirement that the rate of image data input provided to the multiple CRT guns has to be multiplied to match the speed of display. Furthermore, Keller's system is limited to application for monochromatic display, it does not teach a method to apply the multiple CRT guns for displaying improved color image without requiring higher speed and expensive display electronics. Although a multiple beam display CRT as a general concept is well known based on that disclosed by Keller at el., practical application of this multiple-beam system configuration for color display is still limited by the higher bandwidth performance requirements imposed on the display electronics.

In another U.S. Pat. No. 5,389,855, entitled "Multi-beam Electron Gun for Monochrome CRT" (issued Feb. 14, 1995), Chen discloses a multi-beam electron gun for use in a monochrome CRT used in a black and white television or a computer monitor. The display system includes a plurality of vertically aligned aperture for forming electron beams which are deflected in unison across the CRT's display screen to simultaneously trace a plurality of vertically spaced, horizontal scan lines with each display screen sweep. The electron beams are deflected across the screen in a raster-like manner with each beam containing video information for each adjacent scan line. This permits plural adjacent scanning electron beams to simultaneously provide adjacent portions of the same frame of a video image on the display screen. Again, Chen's disclosure teaches how to increase the speed for displaying monochromatic images. The speed of the image line scanning is increased. Chen does not provide a solution to the difficulties that higher speed of image data processor and graphic electronics are required to provide color display data to the multiple gun CRT.

In yet another U.S. Pat. No. 5,350,978, entitled "Multi-beam Group Electron Gun for Color CRT" (issued Sep. 27, 1994), Chen discloses a multi-beam electron gun for color CRT. This multiple gun color CRT simultaneously provides color image information on more than one horizontal scan line thus allows for a reduction in horizontal scan line frequency and associated magnetic deflection yoke operating criteria and increases beam dwell time on the phosphor elements enabling the decrease of beam current without decreasing the display brightness. Chen's system discloses a technique to improve the performance of the color CRT. However, Chen's multiple beam color system does not provide a method to resolve the difficulties that higher speed display electronics are required in order to provide data of three color elements simultaneously to multiple guns to generate color images. The limitations caused by high cost components due to high frequency processes performed by the display electronics required for multiple beam color image display cannot be overcome with the disclosure made by Chen by simply applying this patented system.

Color display based on a color shutter and a black and white CRT is first disclosed by Tektronix in U.S. Pat. No. 4,582,396. The color display system has excellent image quality as well as high quality colors to meet the general requirements of various applications. The color shutter displays disclosed by Tektronix offer a solution to special applications which require small display format and yet high resolutions. The approach again is limited by the requirements that when FSC scheme is implemented with the color shutters, triple frequency bandwidth is required on the display electronics including the computer graphic processor, display deflection and video electronics, the CRT yoke scanning. Due to the cost consideration in design and manufacture of the display electronics, a 1024×768 interlaced image is practically the state of the art capability for a color shutter FSC display system. Another limitation is the requirement of high brightness source due to the relative low transmission rates of the color shutters which is typically 6%. A CRT brightness of 700 fL is required compared with a typical CRT of 100 fL. These limitations hinder practical applications of a FSC color shutter display system to larger image display with screen size greater than 10" and to images of resolution which are higher than 1024×768.

Therefore, a need still exists in the art of color image display to provide a new and improved system and method which can achieve high resolution for larger screen display with higher brightness to overcome the difficulties encountered in the prior art.

SUMMARY OF THE PRESENT INVENTION

It is therefore an object of the present invention to provide a multiple beam color-shutter FSC display system by providing reformatted digitized image data such that the multiple beam display can be achieved without increasing the bandwidth of the display electronics whereby aforementioned difficulties and limitations in the prior art can be overcome.

Specifically, it is an object of the present invention to provide a multiple beam color-shutter FSC display system by providing a new special graphic user interface (S-GUI) to generate reformatted digitized image data such that the multiple beam display can be achieved without increasing the bandwidth of the display electronics.

Another object of the present invention is to provide an multiple beam color-shutter FSC display system by providing a graphic data converter to generate reformatted digitized image data such that the multiple beam display can be achieved without increasing the bandwidth of the display electronics.

Another object of the present invention is to provide a multiple beam color-shutter FSC display system by providing reformatted digitized image data such that the multiple beam display can be achieved without increasing the bandwidth of the display electronics and the brightness of the display can be increased.

Briefly, in a preferred embodiment, the present invention includes a multiple-beam field sequential color (FSC) display system which is provided for receiving a plurality of digitized single-beam image data to display a color image by employing a plurality of CRT guns to project multiple beams, corresponding to the digitized single-beam image data, on a monochromatic CRT screen followed by converting a monochromatic emitting from the CRT screen to the color image by using a liquid crystal color system (LCCS). The multiple-beam display system includes a multiple-beam image data storage means which includes a plurality of segments. The multiple beam display system further includes an image data rearranging means for rearranging and storing the plurality of digitized single-beam image data in the multiple beam-image data storage means according to a pre-designated multiple-beam sequence in each of the segments. The multiple beam display system further includes a multiple-beam image data output control means for receiving a plurality of clock signals to control a sequence and timing of transmitting a multiple-beam image data from the multiple-beam data storage means to the plurality of CRT guns for projecting the multiple beams for generating the color image. In a preferred embodiment, the multiple-beam display system further includes a special graphic user interface (S-GUI) for including the multiple-beam image data storage means, the image data rearranging means, and the multiple-beam image data output control means wherein the S-GUI is implemented as an application specific integrated circuit (ASIC) chip. In yet another preferred embodiment, the special graphic user interface (S-GUI) implemented on the ASIC chip is compatible for installation on a personal computer (PC) for receiving the plurality of digitized single-beam image data therefrom and to display a color image by employing a plurality of CRT guns on a monitor for the personal computer (PC). In yet another preferred embodiment, the multiple-beam display system further includes a data-format converter for including the multiple-beam image data storage means, the image data rearranging means, and the multiple-beam image data output control means. The image data rearranging means further includes a write connect switch for alternately writing and thus rearranging the digitized single-beam image data into the plurality of segments in the multiple-beam image data storage means. The multiple-beam image data output control means further includes a read-connect switch for alternately reading the multiple-beam image data from the plurality of segments in the multiple-beam image data storage means and controlling a sequence and timing of transmitting the multiple-beam image data to the plurality of CRT guns for projecting the multiple beams for generating the color image.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 3:
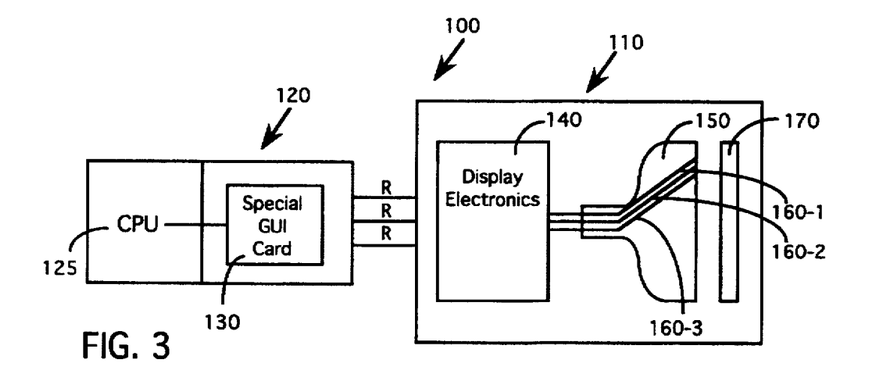
FIGS. 3 and 3A are functional diagrams of a multiple beam display system of the present invention.
Figure 3A:
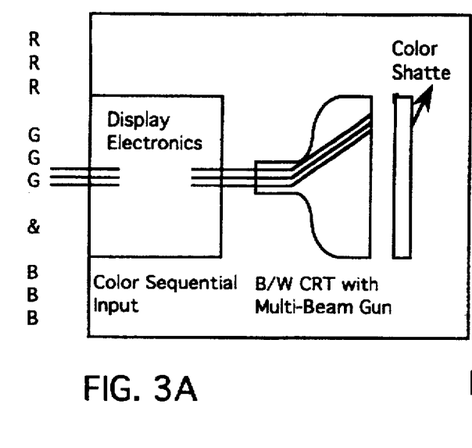
Figure 3B:
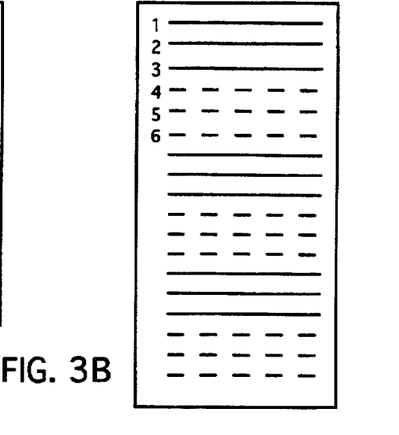
FIG. 3B shows the color field of a three-beam FSC display system of the present invention.

Please refer to FIG. 3 for a system configuration which illustrates a multiple source image display system 100 of the present invention. The display system 100 as shown includes a monitor 110 connected to an image source 120 which is computer includes a CPU 125 and a special graphic user interface (S-GUI) card 130. The monitor 110 includes a multiple beam display electronic 140 which is connected to a monochromatic cathode ray tube (CRT) 150 with multiple guns to generate three electron beams, i.e., 160-1, 160-2, and 160-3 for projecting these beams onto a cathode-ray screen for generating emission of white light which is then filtered through a liquid crystal color shutter (LCCS) 170 for converting the beams into color image display on a screen (not shown). The graphic data generated from the CPU 125 are processed by the special multiple-beam S-GUI card 130 to generate three video line data of the same color which are red, green or blue, i.e., RGB, in sequential order as that shown in FIG. 3A. FIG. 3B shows the arrangement of the field sequential color display wherein each single color field includes three scan lines receiving display pixel data of the same color from three beams 160-1 to 160-3.

As the three electronic beams 160-1 to 160-3 complete the scan of the first three video lines horizontally as that shown in FIG. 3B, these beams will be controlled by the display electronics 140 to scan the next three lines, i.e., lines 4 to 6 with the same color, i.e., red. This process will be continued until the entire frame is completed. The electron beams will then be controlled to return to the top left corner again. The electron beams will then start to write the next color field, i.e., green, and then repeat the process for the next color blue when the entire frame is completed. The color shutter 170 is activated and controlled in a sequential manner to be synchronized with the color field as required by each frame. A full color image display is therefore generated.

With this multiple beam system 100, the frequency bandwidth of the graphic processor, i.e., the special S-GUI card 130, and the display electronics 140 can be maintained at same level as the current color shadow mask display system. Triple frequency requirement as that required by a conventional field sequential display system is no longer required because the multiple beam arrangement and the system configuration which enables the display of multiple beams of the same color for the entire frame as that described above. The display of higher resolution, e.g., 1280 by 1024 pixels in each frame, can be achieved without being limited by the processing speed of the electronic required in a conventional field sequential system which demands triple frequency for the display of RGB pixels. Higher resolution display which often is required for larger display monitors such as 15-inch display or larger screen can be accomplished.

Another benefit of employing three electron beams is the improvement in display brightness. Compared with the conventional single CRT beam systems operated with same cathode current, the brightness of the present system as shown in FIG. 3 is increased three times because of the use of three electron beams. It is feasible to provide high CRT brightness of 700 fL on a large CRT screen without requiring to increase the cathode current beyond an acceptable range such that the CRT life span and reliability can be maintained at a reasonable level.

Figure 4A:
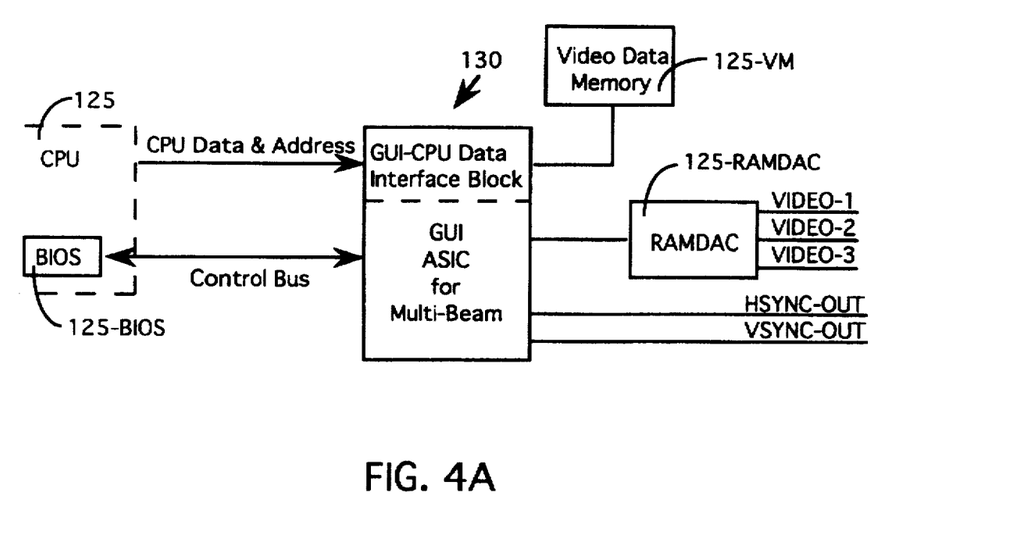
FIGS. 4A and 4B show the functional block diagram of a first preferred embodiment of a multiple beam display system of the present invention.

FIG. 4A is a functional block diagram showing the interfaces of the S-GUI card 130 with a personal computer controlled by a CPU 125 to operate a basic input/output system (BIOS) 125-BIOS and a video memory 125-VM wherein the video data to be displayed are stored. The S-GUI card 130 includes a data buffer 130-DB, shown in FIG. 4B to receive CPU data via a CPU data bus. The S-GUI card 130 also receives control signals from the CPU 125 via a CPU control bus. By processing the data received, the S-GUI card 130 generates multiple beam display signals video-1, video-2 and video-3 via a random access memory digital to analog converter (RAMDAC) 125-RAMDAC. The S-GUI card 130 further provides horizontal and vertical synchronization signals, i.e., HSYNCH and VSYNCH signals respectively to control the timing and sequencing of multiple beam display on the monitor 110 in FIG. 3.

Figure 4B:
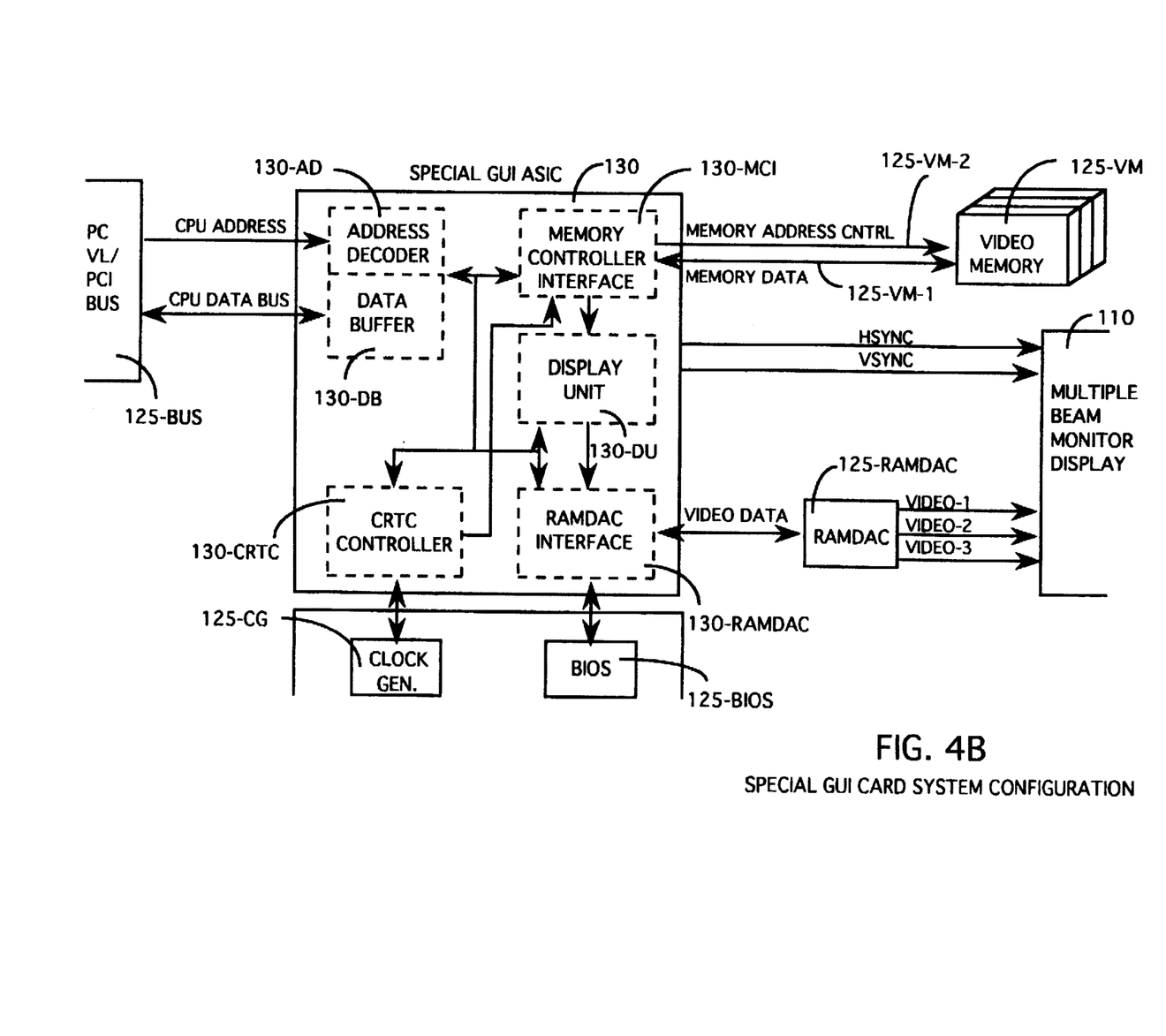

FIGS. 4B is a functional block diagram for showing, in more details, the structure and functions of the graphic user interface (S-GUI) card 130 of the present invention. The S-GUI card 130 for this preferred embodiment is formed as an application specific integrated circuit (ASIC) card and this card 130 can then be conveniently installed into a personal computer (PC) by incorporating this ASIC chip on a printed circuit board for inserting into an installation slot for receiving and generating input and output data for interface with the CPU 125 of the personal computer and the display system 110. The S-GPU card 130 and the monitor 110 are controlled by the personal computer in receiving clock signals from a clock generator 125-CG which generated a pixel clock signal for the display data and the memory clock signals for the video memory (to be described below). The S-GPU card 130 and the monitor 110 are also controlled by the personal computer through commands sent from a basic input/output system (BIOS) 125-BIOS which controls the display modes, the monitor refresh rate, and provide information for the screen size and the positioning data. The data from the CPU 125 are sent to the S-GPU card 130 via a PC VL/PCI bus, i.e., CPU bus 125-bus, wherein the CPU address is sent to an address decoder 130-AD and the data are sent to a data buffer 130-DB. The data buffer 130-DB is used to stored data serving an interface function between the CPU 125 and the S-GUI card 130. The personal computer can read or write the data of S-GUI card 130 through this block. The address decoder 130-AD is used to decode a PC address for access to a designated block of data in the data buffer 130-DB. The S-GUI card 130 also receives video data for screen display from the personal computer wherein the video data are stored in a video memory 125-VM which are transferred to the S-GUI card 130 via a video memory data bus 125-VM-1 and a memory address and control bus 125-VM-2 to a memory controller interface 130-MCI. The memory controller interface 130-MCI supports the data transfer between the video memory 125-VM and the personal computer in read and write operations. The memory controller interface 130-MCI also latches the display data received from the video memory 125-VM and send the data to the display unit 130-DU. The display unit 130-DU receives the video data for generating and sending corresponding data blocks, according to the timing signals received from a CRTC 130-CRTC (see description below), to a RAMDAC interface unit 130-RAMDAC. In addition to the video data received from the display unit 130-DU, the RAMDAC interface unit 130-RAMDAC also receives display timing data from a CRT controller 130-CRTC. The CRTC controller 130-CRTC generates clock signals for the horizontal and vertical synchronization, timing data for cursor and underline, timing data for fresh video memory, and timing data for scrolling and panning. These timing signals are sent to the memory controller interface 130-MCI, the display unit 130-DU, and the RAMDAC interface unit 130-RAMDAC to control the arrangements, e.g., the order of video data blocks to be displayed, and timing, e.g., the latching operations, of data transfer. The display unit 130-DU which controls the multiple beam display by sending horizontal and vertical synchronization signals, i.e. HSYNCH and VSYNCH to the monitor 110. The RAMDAC interface unit 130-RAMDAC also transfer corresponding video data to a random access memory digital to analog converter (RAMDAC) 125-RAMDAC wherein three video display data for multiple beam display, i.e., video-1, video-2, and video-3 are generated and sent to the monitor 110 for display. The timing and sequencing of the multiple beam display are in coordination with the synchronization signals transferred form the display unit 130-DU.

The first major function of this S-GUI card 130 is to re-arrange the order of the video data which are originally arranged for single beam display. The video data after being rearranged by the S-GUI card 130 are suitable for multiple beam display. The second function performed by the S-GUI card 130 is to control the timing of these re-arranged video data to the monitor 110 through a RAMDAC for generating multiple beam analog display data, i.e., video-1, video-2, and video-3, such that the multiple beam data are being coordinated and synchronized according the time sequence as explained in FIG. 3B. By installing this special S-GUI ASIC card 130 onto a personal computer to interface with the CPU 125, a multiple beam display can be realized in a CRT monitor 110 equipped with multiple CRT projection guns.

Figure 4C:
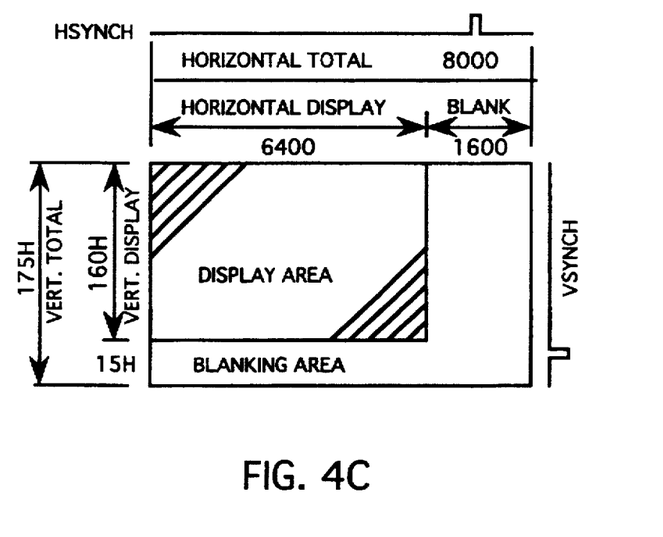
FIG. 4C shows the arrangement and functions of a frame of image data
Figure 4D:
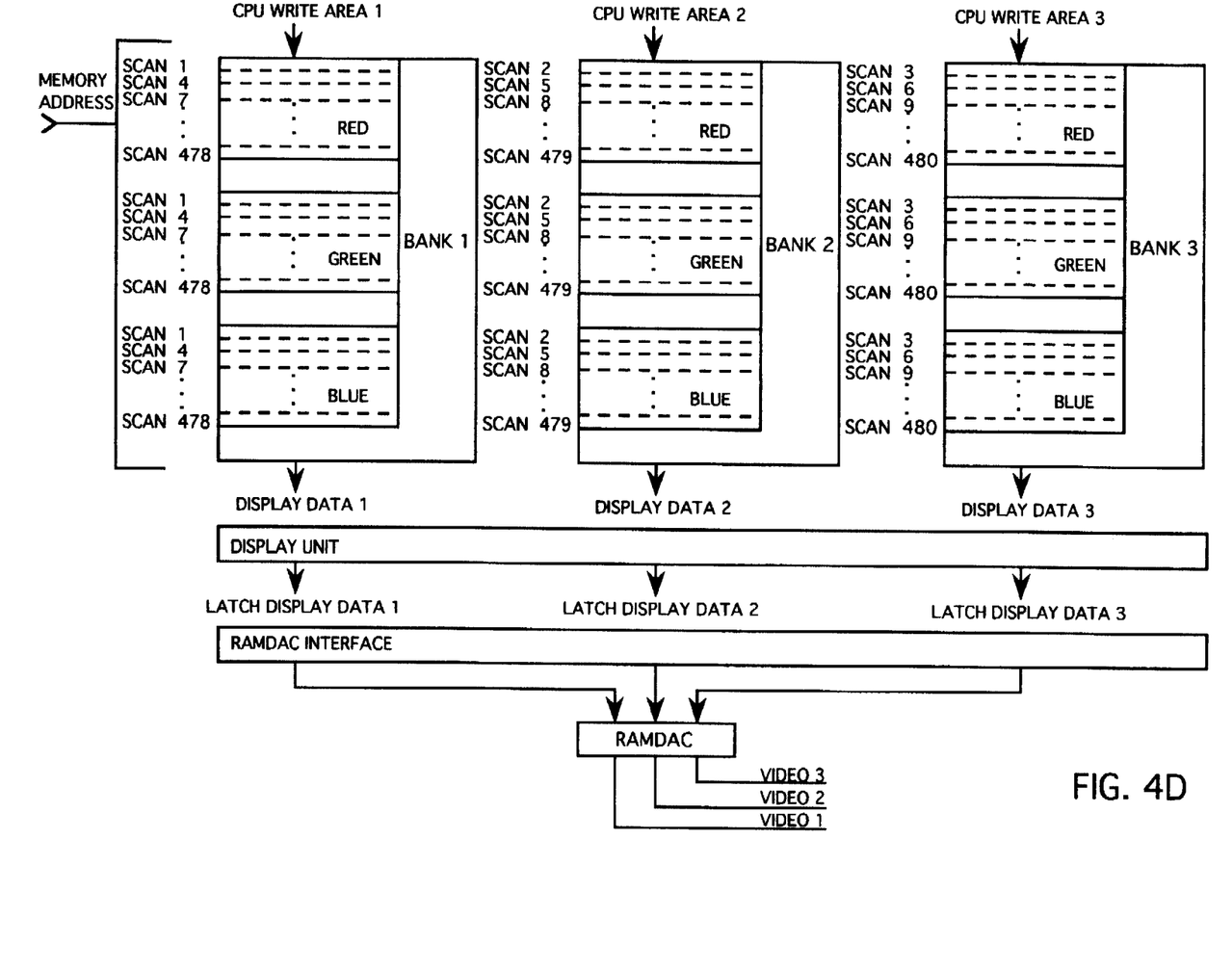
FIG. 4D shows the memory map for the video data for image display by a display system of FIGS. 4A and 4B.
Figure 4E:
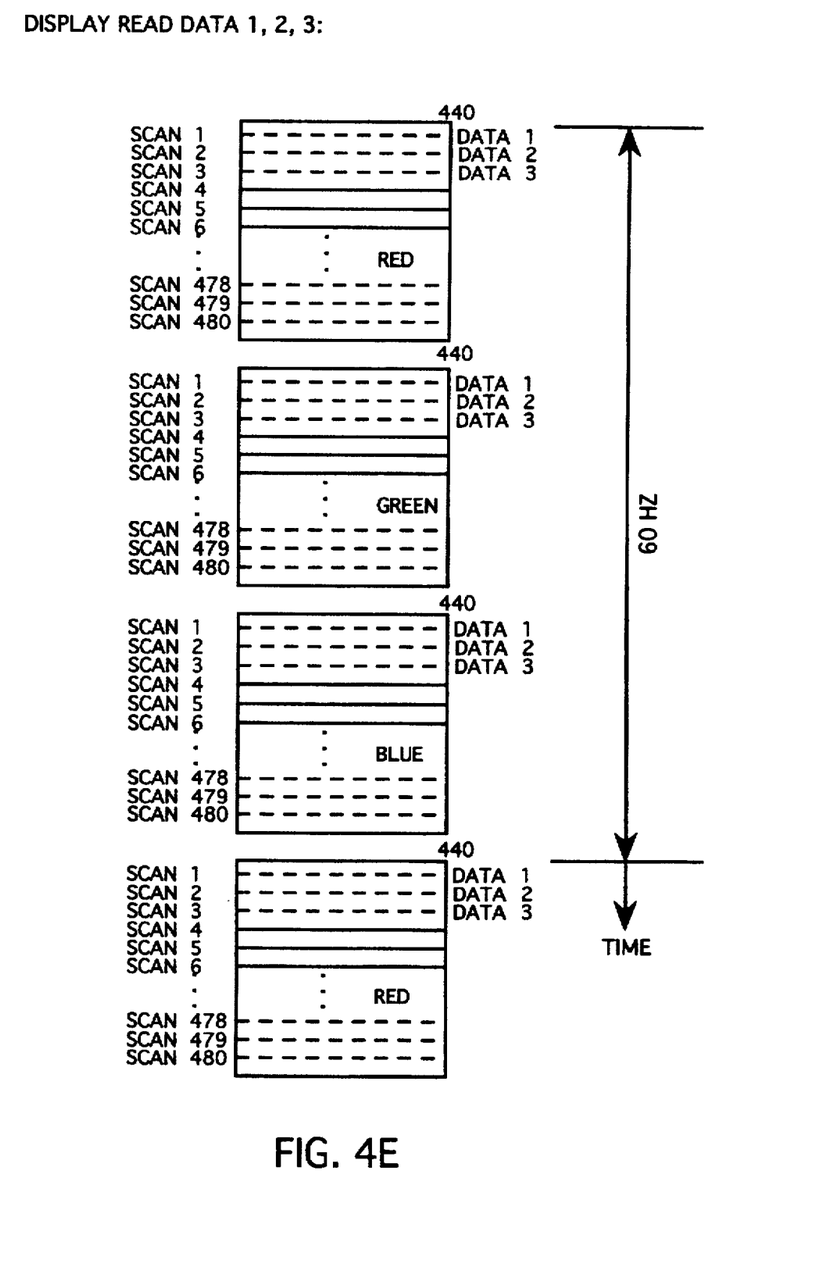
FIG. 4E shows a color field for the scan lines for display of a video image with a multiple beam CRT of FIGS. 4A and 4B.

Please refer to FIGS. 4C to 4E for the rearrangement of pixel data included in a frame for display, as that shown in FIG. 4C, in order to understand the processes performed by the special S-GUI card 130 of the present invention. When the personal computer 120 issues a command to display a VGA frame including 640-by-480 pixels at a frequency of 60 Hz, this VGA frame of data is transmitted to the data buffer via an address decoder and a "true color mode" signal is also sent to the 125-BIOS to begin a color display operation. FIG. 4C shows the video data structure of a normal screen display. A frame of video data includes a total of 800 dots, i.e., 800D, wherein 640D are for display and 160D are blank. Vertically, it includes a total of 175 horizontal lines, i.e., 175H, wherein 160H are for display and 15H are blank. Each horizontal line includes three scan lines. After the 125-BIOS receives the true color mode signal, it controls a clock generator to generate a 25.175 MHz dot clock signal. Upon receiving the dot clock signals, the CRTC controller generates 800 dots and the frequency of these dots is HSYNCH=25.17 MHz/800=31.468 KHz The CRTC also generates a frequency for display of horizontal lines of:

VSYNCH3=31.468 MHz/175=179.82 Hz

Since each horizontal line includes three scan lines, the frequency of one screen of display is:

FSYNC=VSYNC3/3=179.82 Hz/3=59.94 Hz.

Thus a frame synchronization signal is generate at that frequency for the purpose of providing instructional signals for alternating the display of red, green and green data, i.e., R, G, and B data, sequentially. Under the control of 125-BIOS, the memory control interface 130-MCI generates a memory address and a control signal for the video memory 125-VM. The display unit retrieves display data DATA-1, DATA-2, and DATA-3 from the video memory and transmits the display data to RAMDAC interface. The RAMDAC interface transmits the video data to RAMDAC for generating three corresponding VIDEO-1, VIDEO-2, and VIDEO-3 for a multiple beam monochromatic CRT for display.

The above procedure sequences are basically similar to a what is performed by a regular GUI for a regular single beam display system except that the addresses for writing of the image data into the video memory 125-VM controlled by the memory control interface 130-MCI and the order of transmitting video data for multiple-beam display controlled by CRT controller 130-CRTC are different. In order to generate video data for display by the multiple display system 100, the image data are specially arranged as that shown in FIGS. 4D and 4E. Under the control of memory control interface 130-MCI, the image data are stored in three data banks, i.e., bank-1, bank-2, and bank-3 in the order as that shown in FIG. 4D. Each of these banks then provides video data sequentially to the display unit 130-DU which are then processed by the RAMDAC interface and the RAMDAC to generate VIDEO-1, VIDEO-2, and VIDEO-3 data. The read sequence from the RAMDAC for screen display is shown in FIG. 4E. Sequentially, an entire frame of red, green and blue data are displayed by the use of three CRT guns. A field sequence color (FSC) image is then shown by the use of three CRT guns with the video data which are stored and read in a specially arranged order under the control of the specially designed S-GUI of the present invention.

Figure 5:
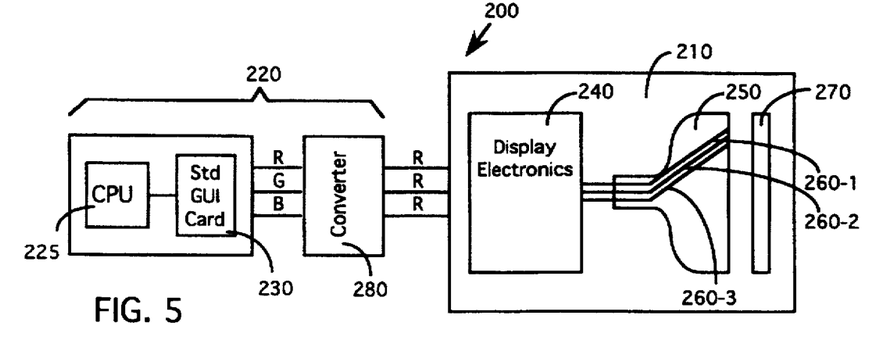
FIG. 5 shows a functional block of a multi-beam display system as a second preferred embodiment of the present invention.

FIG. 5 is a functional block diagram of an alternate preferred embodiment of a color display system 200 of the present invention. The display system 200 as shown includes a monitor 210 connected to an image source 220 which includes a computer 222 and a converter 280. The computer 222 includes a CPU 225 and a standard graphic user interface (GUI) card 230. The monitor 210 includes a multiple beam display electronic 240 which is connected to a monochromatic cathode ray tube (CRT) 250 with multiple guns to generate three beams, i.e., 260-1, 260-2, and 260-3 for projecting these beams onto a CRT surface for producing a whit light emission which is then filtered by a liquid crystal color shutter (LCCS) system 270 for converting the beams into color image display on a screen (not shown). The graphic data generated from the CPU 225 are processed by the standard GUI 230 to generate three video line data of three basic colors, i.e., red, blue and green (RGB), like the conventional graphic user interface. In receiving these three beams of three different basic colors, i.e., RGB colors, as input graphic data, the converter then convert them into three same color beam, i.e., three beams of red, blue, or green colors, depending on the time sequences of the input beam data from the GUI 230. Similar to that shown in FIG. 3B, the output from the converter 280 then outputted to the monitor 210 with the beams having a sequential same-color three-beam arrangement according to the field sequential color sequences for display. Thus, each single color field includes three scan lines are generated from the converter 280 which are received by the monitor system 210 as display pixel data of the same color from three beams 260-1 to 260-3.

As the three electronic beams 260-1 to 260-3 complete the scan of the first three video lines horizontally as that shown in FIG. 3B, these beams will be controlled by the display electronics 240 to scan the next three lines, i.e., lines 4 to 6 with the same color, i.e., red. This process will be continued until the entire frame is completed. The electron beams will then be controlled to return to the top left corner again. The electron beams will then start to write the next color field, i.e., green, and then repeat the process for the next color blue when the entire frame is completed. The color shutter 270 is activated and controlled in a sequential manner to be synchronized with the color field as required by each frame. A full color image display is therefore generated.

With this multiple beam system 200, by taking advantage of the functions performed by the converter 280 in combination with the display electronics 240, the frequency bandwidth of the graphic processor, ie., the GUI card 220, and the display electronics 240 can be maintained at same level as the current color shadow mask display system. Triple frequency requirement as that required by a conventional field sequential display system is not required because the multiple beam arrangement and the system configuration which enables the display of multiple beams of the same color for the entire frame as that described above. Also, another benefit of this invention can be realized which is particularly important for a large screen because the display brightness is increased. Since the display is now carried out by three scanning electronic beams, the brightness is increased three times when compared with a display performed by a single electronic beam operated with a similar cathode current Therefore, it is feasible to provide a high CRT brightness of 700 fL on a large CRTs with this multiple beam display system while maintaining an acceptable life and performance reliability.

Figure 6:
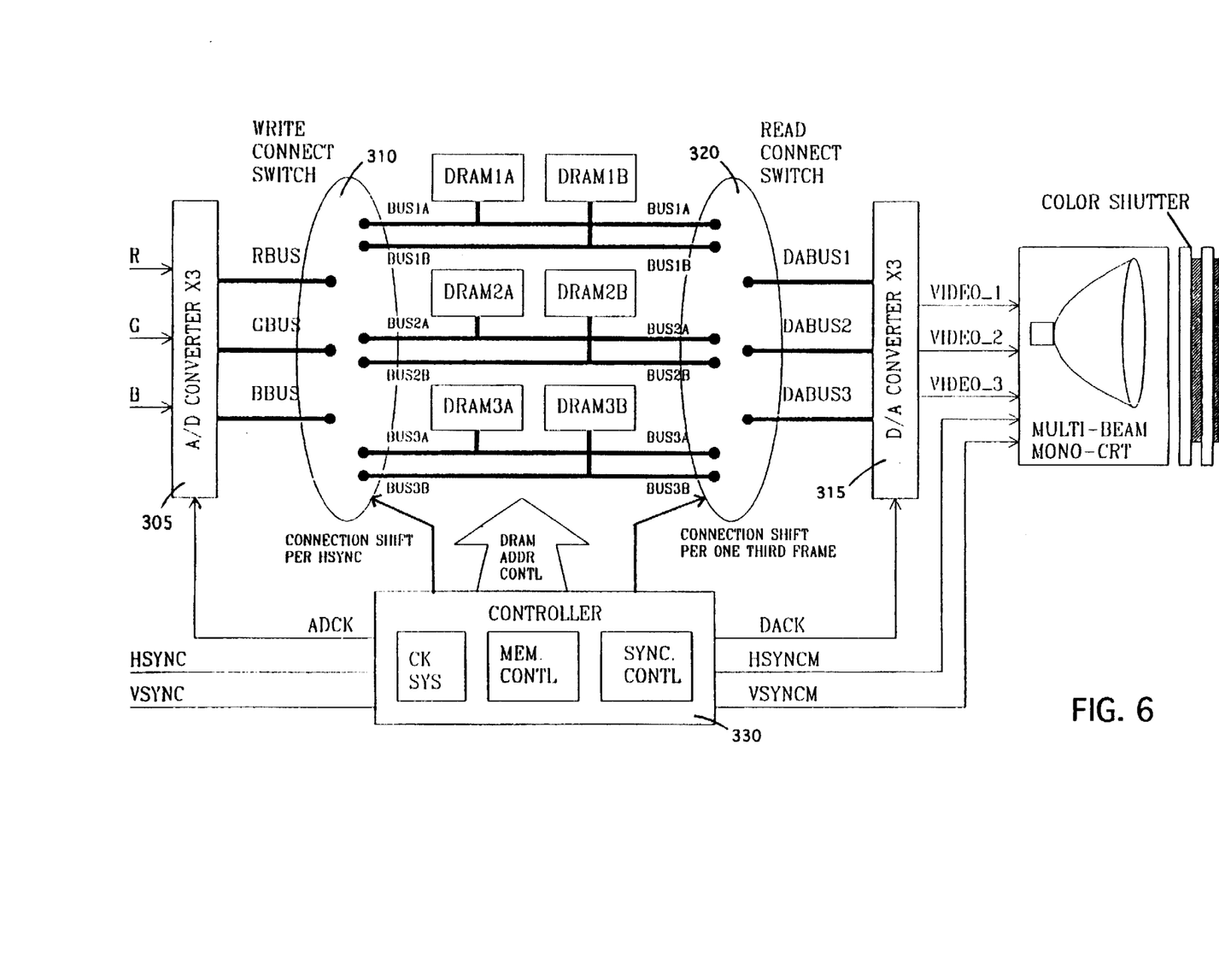
FIG. 6 shows a functional diagram of a data format converter for a FSC display system with multi-beam CRT of FIG. 5.

FIG. 6 is a functional block showing the system configuration and the functions performed by the display date format converter 280. An analog to digital converter 305 is employed to first convert the video analog data to a stream of digital data representing video signals of red, green and blue (RGB) signals. The digitized RGB data are controlled by a write connect switch 310 to be transferred by a three separate data buses, i.e., RBUS, GBUS and BBUS, to an array of dynamic random access memory (DRAM) banks, i.e., DRAM1A, DRAM1B, DRAM2A, DRAM2B, DRAM3A, and DRAM3B, in particular sequential order to be stored in different data banks for the purpose of format conversion which is to be further explained below. Each of these DRAM data banks, i.e., DRAM1A to DRAM3B, is connected to a corresponding data bus, i.e., BUS1A to BUS3B respectively. The DRAM data buses are further employed to provide data to a digital to analog converter (DAC) 315 with a connection provided by a read connection switch 320 and three data buses, i.e., DABUS1, DABUS2, and DABUS3. The DAC 315 generates analog video data, i.e., video_1, video_2, and video_3, in a specially arranged order, as that shown in FIG. 3B, to be transferred to a multiple beam CRT display system 210.

The timing and operational sequence of the write connect switch 310, DRAM data banks, and the read connect switch 320 are controlled by a controller 330. The controller 330 further receives from the CPU 125 a horizontal synchronization signal HSYNCH, a vertical synchronization signal VSYNCH, and these signals are combined with a clock signal generated by a clock system CK SYS, to provide a clock signal ADCK to the A/D converter 305, a dock signal DACK to the D/A converter 315. The controller further includes a memory control MEM CONTL to generate an DRAM address control signal to control the read and write address according to the frame synchronization as will be further described below. The controller 330 further includes a synchronization control unit, i.e., SYNC CONTL to generate synchronization control signals HSYNCM and VSYNCM to control horizontal and vertical synchronization. These synchronization signals are sent to the multiple beam monochromatic CRT 210 for controlling the synchronization of the multiple beam display to be performed using the video data VIDEO_1, VIDEO_2, and VIDEO_3.

Figure 7:
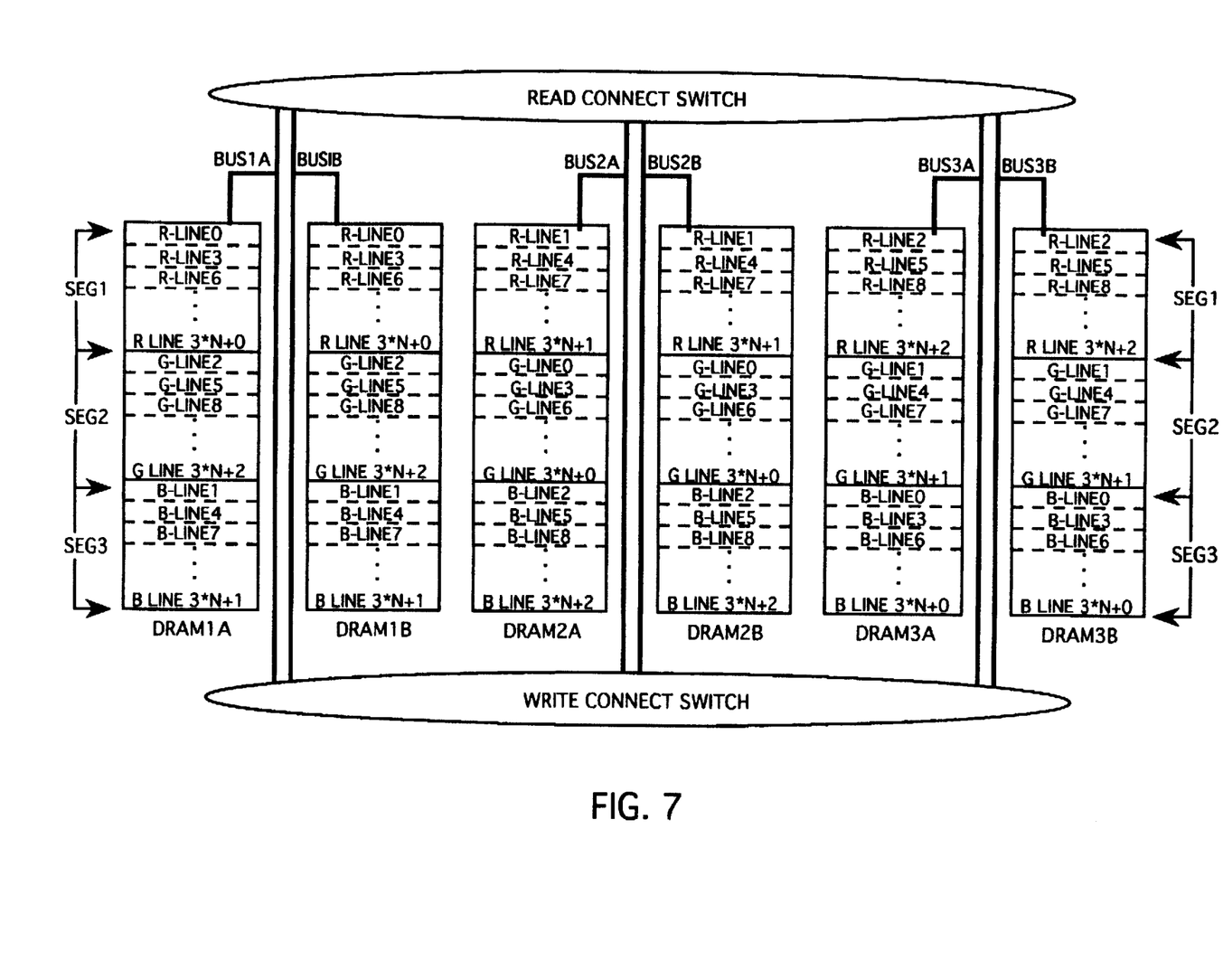
FIG. 7 shows the memory configuration for a FSC display system to be implemented by the data format converter of FIG. 6.

The format conversion of the video data for a single beam display system to a different format suitable for multiple beam display are thus performed by the format converter 280. The format converter 280 coordinates the timing and sequences of reading and writing of video data which are stored in different locations in the DRAM data banks according to specific sequential arrangements and organization rules. Please refer to FIG. 7 for the organization of the data blocks arranged in the array of six data banks DRAM1A to DRAM3B. Each data bank is divided into three segments wherein each DRAM bank has data storage capacity to store one-third (⅓) of the data for one frame of video display in the form of binary bits. Segment 1, i.e., SEG-1, of DRAM1A and DRAM1B are employed to store the video data for the red line 0, 3, 6, . . . , 3N+0, i.e., the video data for R-line 3n+0, where n=0, 1, 2, . . . , N and N is the total number of scan lines of the monitor 110. Segment 2, i.e., SEG-2, of DRAM1A and DRAM1B are employed to store the video data for green-line 2, 5, 8, . . . 3N+2, i.e., the video data for G-line 3n+2, where n=0, 1, 2, . . . , N. Similarly, segment 3, i.e., SEG-3, of DRAM1A and DRAM1B are employed to store the video data for blue-line 1, 4, 7, . . . 3N+1, i.e., the video data for red line 3n+1, where n=0, 1, 2, . . . , N. In the same manner, the data banks DRAM2A, DRAM2B, DRAM3A and DRAM3B each stores the video data according to the order and organization as that shown in FIG. 7. These pairs of data banks, i.e., bank A and bank B of these DRAMs, are operated in a ping-pong manner, i.e., when bank-A is in the process of receiving and storing data, bank-B is sending and writing data out from the data bank, and vice-versa. As the data block, i.e., the binary bits representing the image of a scan line of a particular color, are read out from each DRAM bank, the write connect switch 320 is controlled to provide a data bus connection according to a predefined timing and sequence to send the data to the D/A converter 315 for providing VIDEO_1, VIDEO_2, and VIDEO_3 image data for each scanning line such that these three scanning line data correspond to an order of line 3n+0, 3n+1, and then 3n+2, according to an RGB sequence. Therefore, an image display by the use of a multiple beam CRT in generating a color image as that shown in FIG. 3A and 3B is achieved without a requirement to increase the processing speed of the display electronics.

Figure 8A:
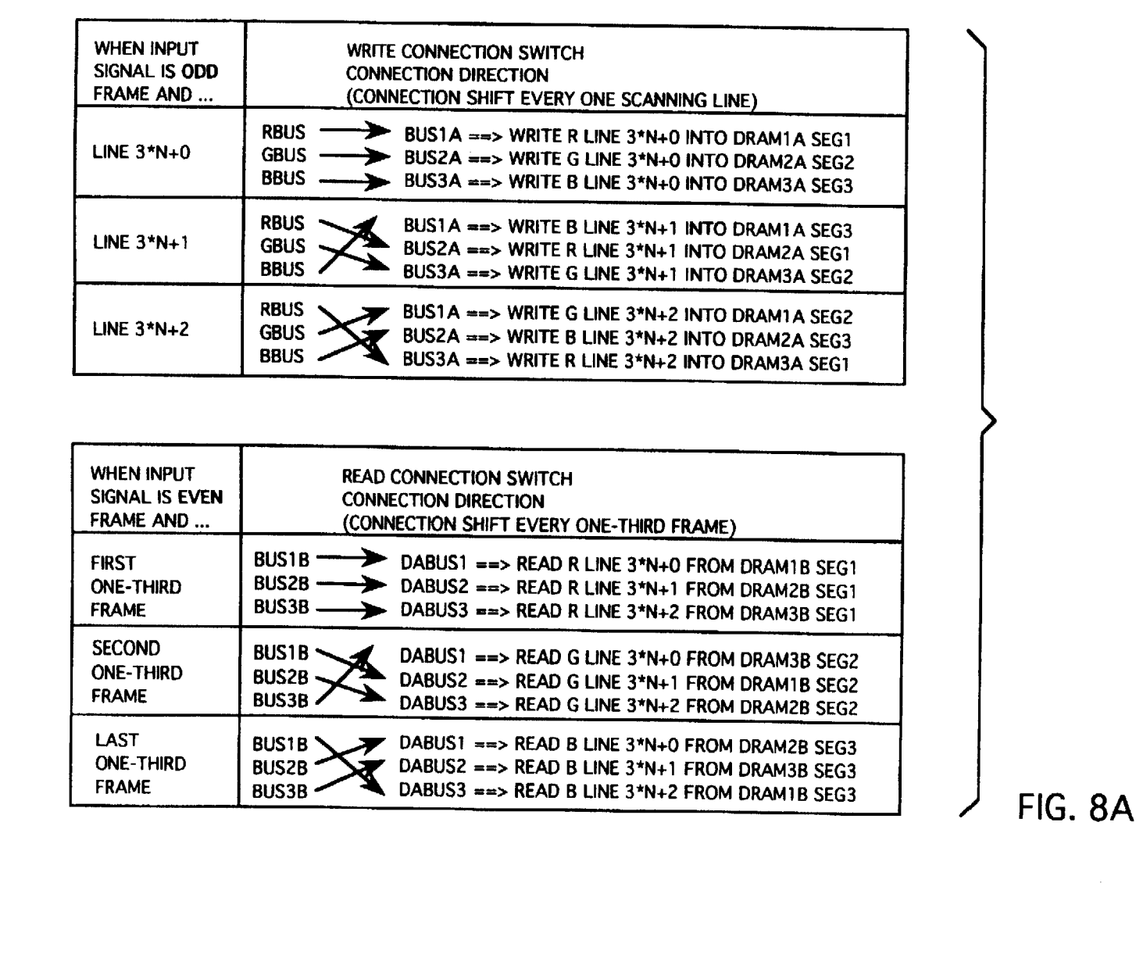
FIGS. 8A and 8B show the write and read connection table for odd and even frames respectively implemented by the data format converter of FIG. 6.
Figure 8B:
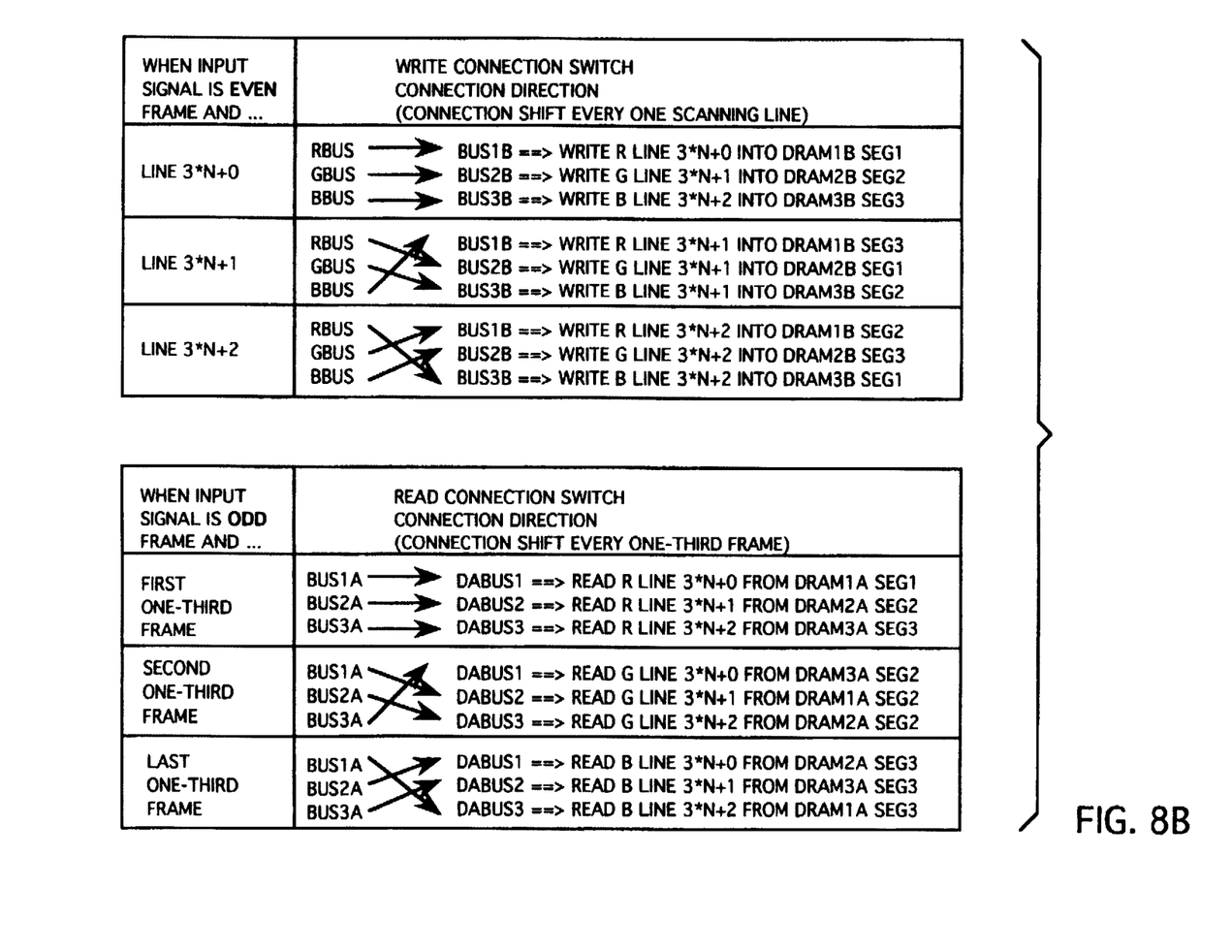

Referring now to FIGS. 8A and 8B for the sequential order for switching the data bank connection of the read connect switch 310 and the write connect switch 320. When the odd number of scan line data are received, the read connect switch 310 adjusts the connection every other scan line, i.e., in the period of receiving line 3n+0, RBUS is connected to BUS1A to store the R-line 3n+0 to SEG1 of DRAM1A. GBUS is connected to BUS2A to store the G-line 3n+0 to SEG2 of DRAM2A, and BBUS is connected to BUS3A to store the B-line 3n+0 to SEG3 of DRAM3A. In a same manner, the reception and storage of scan-line data into different segments in DRAM data banks are carried out according to the order as shown in FIGS. 8A and 8B. When the input video data of the odd number of lines are stored into bank-A, the data of a prior frame, i.e., the even number of frames, which is stored in the data bank-B, in a prior input period, are being transferred as output through write connect switch 320. The write connect switch is adjusted at the frequency of every one-third of frame. In the period of a first one-third frame, BUS1B is connected to DABUS1 for retrieving R-line 3n+0 data from SEG1 of DRAM1B, BUS2B is connected to DABUS2 for retrieving R-line 3n+1 data from SEG1 of DRAM2B, and BUS3B is connected to DABUS3 for retrieving R-line 3n+2 data from SEG1 of DRAM3B. In a same manner, the write connect switch 320 are adjusted in the second one-third frame period, and the last one-third frame period according to the order as that listed in FIGS. 6A and 6B.

Subsequently, during the time when the input data for the even number of frames are being received, data bank-B are employed for receiving and storing the data of the even number of frames while data banks A are sending out data with the write connect switch adjusting the data bank connection every one-third of frame as that shown in FIGS. 8A and 8B, while the read connect switch 310 is being adjusted every scanning line for reading and storing data into different segments of these six data banks as described above. By rearranging data organization and by controlling the reading and writing of video data, the video output data can be reformatted and suitable for a multiple beam CRT display to achieve higher resolution and increased brightness for a large screen without applying high speed expensive electronic devices.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A multiple-beam field sequential color (FSC) display system provided for receiving a plurality of digitized single-beam image data to display a color image by employing a plurality of CRT guns to project multiple electron beams, corresponding to said digitized single-beam image data, on a monochromatic CRT screen followed by converting responsive CRT monochromatic emissions to said color image by using a liquid crystal color system (LCCS), said multiple-beam display system further comprising:

an image data storage means including a plurality of segments;

an image data rearranging means for rearranging and storing said plurality of digitized single-beam image data in said image data storage means according to a pre-designated multiple-beam sequence in each of said segments;

a multiple-beam image data output control means for receiving a plurality of clock signals and display control signals to control a sequence and timing of transmitting a multiple-beam image data from said data storage means to said plurality of CRT guns for projecting said multiple beams for generating said color image; and a special graphic user interface (S-GUI) implemented as an application specific integrated circuit (ASIC) chip for including said image data rearranging means and said multiple-beam image data output control means.

2. The multiple-beam display system of claim 1 wherein:

said special graphic user interface (S-GUI) implemented on said ASIC chip is compatible for installation on a personal computer for receiving said plurality of digitized single-beam image data therefrom and to display a color image by employing a plurality of CRT guns on a monitor for said personal computer.

3. The multiple-beam display system of claim 2 wherein:

said image data rearranging means of said S-GUI further includes a special memory controller interface (S-MCI) for controlling a rearrangement and storage of said plurality of digitized single-beam image data in said image data storage means according to said pre-designated multiple-beam sequence in each of said segments; and said multiple-beam image data output control means of said S-GUI further includes a special CRT controller (S-CRTC) for controlling a sequence and timing of transmitting said multiple-beam image data from said data storage means to said plurality of CRT guns for projecting said multiple beams for generating said color image.

4. The multiple-beam display system of claim 1 further comprising:

a data-format converter for including said data storage means, said image data rearranging means, and said multiple-beam image data output control means wherein:

said image data rearranging means further includes a write connect switch for alternately writing and thus rearranging said digitized single-beam image data into said plurality of segments in said image data storage means; and said multiple-beam image data output control means further includes a read-connect switch for alternately reading said multiple-beam image data from said plurality of segments in said image data storage means and controlling a sequence and timing of transmitting said multiple-beam image data to said plurality of CRT guns for projecting said multiple beams for generating said color image.

5. A special graphic user interface (S-GUI) provided for receiving and storing a plurality of digitized single-beam image data in an image data storage means to display a color image by employing a plurality of CRT guns to project multiple electron beams, corresponding to said digitized single-beam image data, on a monochromatic CRT screen followed by converting responsive CRT monochromatic emissions to said color image by using a liquid crystal color system (LCCS), said S-GUI comprising:

an image data rearranging means for rearranging and storing said plurality of digitized single-beam image data in said image data storage means according to a pre-designated multiple-beam sequence in several segmented data banks of said image data storage means; and a multiple-beam image data output control means for receiving a plurality of clock signals and display control signals to control a sequence and timing of transmitting a multiple-beam image data from said data storage means to said plurality of CRT guns for projecting said multiple beams for generating said color image.

6. The S-GUI of claim 5 wherein:

said S-GUI implemented as an application specific integrated circuit (ASIC) chip for including said image data rearranging means and said multiple-beam image data output control means on an integrate circuit (IC).

7. The S-GUI of claim 6 wherein:

said special graphic user interface (S-GUI) implemented on said ASIC chip is compatible for installation on a personal computer for receiving said plurality of digitized single-beam image data therefrom and to display a color image by employing a plurality of CRT guns on a monitor for said personal computer.

8. The S-GUI of claim 7 wherein:

said image data rearranging means further includes a special memory controller interface (S-MCI) for controlling a rearrangement and storage of said plurality of digitized single-beam image data in said image data storage means according to said pre-designated multiple-beam sequence in each of said segments; and said multiple-beam image data output control means further includes a special CRT controller (S-CRTC) for controlling a sequence and timing of transmitting said multiple-beam image data from said data storage means to said plurality of CRT guns for projecting said multiple beams for generating said color image.

9. A multiple-beam image data converter for receiving a plurality of digitized single-beam image data to display a color image by employing a plurality of CRT guns to project multiple electron beams, corresponding to said digitized single-beam image data, on a monochromatic CRT screen followed by converting responsive CRT monochromatic emissions to said color image by using a liquid crystal color system (LCCS), said data converter comprising:

an image data storage means including a plurality of segments;

an image data rearranging means including a write connect switch for alternately writing and thus rearranging and storing said digitized single-beam image data according to a pre-designated multiple-beam sequence into said plurality of segments in said image data storage means; and a multiple-beam image data output control means for receiving a plurality of clock signals and display control signals further including a read-connect switch for alternately reading said multiple-beam image data from said plurality of segments in said image data storage means for controlling a sequence and timing of transmitting a multiple-beam image data to said plurality of CRT guns for projecting said multiple beams for generating said color image.

10. A method for applying a multiple-beam field sequential color (FSC) display system for receiving a plurality of digitized single-beam image data and to display a color image by employing a plurality of CRT guns to project multiple electron beams, corresponding to said digitized single-beam image data, on a monochromatic CRT screen followed by converting responsive CRT monochromatic emissions to said color image by using a liquid crystal color system (LCCS), said method comprising steps of:

(a) employing an image data rearranging means for rearranging and storing said plurality of digitized single-beam image data in an image data storage means according to a pre-designated multiple-beam sequence in each of said segments;

(b) employing a multiple-beam image data output control means for receiving a plurality of clock signals and display control signals to control a sequence and timing of transmitting a multiple-beam image data from said data storage means to said plurality of CRT guns for projecting said multiple beams for generating said color image; and (c) implementing a special graphic user interface (S-GUI) on an application specific integrated circuit (ASIC) chip for integrating said image data rearranging means and said multiple-beam image data output control means on an integrated circuit (IC).

11. The method for displaying a color image of claim 10 wherein:

said step (c) of implementing said special graphic user interface (S-GUI) on an application specific integrated circuit (ASIC) chip is a step (c1) of implementing said ASIC chip to be compatible for installation on a personal computer for receiving said plurality of digitized single-beam image data therefrom and to display a color image by employing a plurality of CRT guns on a monitor for said personal computer.

12. The method for displaying a color image of claim 11 wherein:

said step (c1) of implementing said ASIC chip compatible for installation on a personal computer including a step (c2) of implementing a special memory controller interface (S-MCI) for controlling a rearrangement and storage of said plurality of digitized single-beam image data in said image data storage means according to said pre-designated multiple-beam sequence in each of said segments; and said step (b) of implementing a said multiple-beam image data output control means of said S-GUI further including a step (b1) of implementing a special CRT controller (S-CRTC) for controlling a sequence and timing of transmitting said multiple-beam image data from said data storage means to said plurality of CRT guns for projecting said multiple beams for generating said color image.

13. The method of displaying a color image of claim 10 further comprising steps of:

(d) employing a data-format converter for including said data storage means, said image data rearranging means, and said multiple-beam image data output control means;

(e) employing a write connect switch in said image data rearranging means for alternately writing and thus rearranging said digitized single-beam image data into said plurality of segments in said image data storage means; and (f) employing a read-connect switch in said multiple-beam image data output control means for alternately reading said multiple-beam image data from said plurality of segments in said image data storage means and controlling a sequence and timing of transmitting said multiple-beam image data to said plurality of CRT guns for projecting said multiple beams for generating said color image.

* * * * *